United States Patent
Zhao et al.

(10) Patent No.: US 12,425,574 B2
(45) Date of Patent: Sep. 23, 2025

(54) LOCAL ILLUMINATION COMPENSATION FOR BI-PREDICTION

(71) Applicant: Tencent America LLC, Palo Alto, CA (US)

(72) Inventors: Xin Zhao, San Jose, CA (US); Guichun Li, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 196 days.

(21) Appl. No.: 18/381,538

(22) Filed: Oct. 18, 2023

(65) Prior Publication Data

US 2024/0137488 A1  Apr. 25, 2024
US 2024/0236300 A9  Jul. 11, 2024

Related U.S. Application Data

(60) Provisional application No. 63/417,930, filed on Oct. 20, 2022.

(51) Int. Cl.
*H04N 7/12* (2006.01)
*G06T 5/20* (2006.01)
*G06T 5/90* (2024.01)
*H04N 19/105* (2014.01)
*H04N 19/167* (2014.01)
*H04N 19/172* (2014.01)
(Continued)

(52) U.S. Cl.
CPC ............. *H04N 19/105* (2014.11); *G06T 5/20* (2013.01); *G06T 5/90* (2024.01); *H04N 19/167* (2014.11); *H04N 19/172* (2014.11); *H04N 19/176* (2014.11); *H04N 19/573* (2014.11); *G06T 2207/10016* (2013.01)

(58) Field of Classification Search
CPC .................................................. H04N 19/105
See application file for complete search history.

(56) References Cited

U.S. PATENT DOCUMENTS

2021/0185328 A1  6/2021  Xu et al.
2022/0232233 A1  7/2022  Zhao et al.

OTHER PUBLICATIONS

International Search Report and Written Opinion issued in Application No. PCT/US2023/077328, mailed Feb. 14, 2024, 11 pages.
(Continued)

*Primary Examiner* — Y Lee
(74) *Attorney, Agent, or Firm* — ARENTFOX SCHIFF LLP

(57) ABSTRACT

Processing circuitry receives coded information of a current block indicative of applying LIC on the current block according to at least a first reference block in a first reference picture. The processing circuitry determines, for a sample in the current block, at least a first reference sample in the first reference block, the first reference sample is co-located to the sample in the current block. The processing circuitry calculates a weighted sum of a plurality of terms and an offset for the LIC according to a plurality of parameter values for a plurality of parameters used in the LIC, and reconstructs the sample accordingly. The plurality of parameter values includes at least a first weighting value for a first weighting that is applied to a non-linear term of the first reference sample of a kth power, k is a power index value and is not equal to 1.

20 Claims, 11 Drawing Sheets

(51) Int. Cl.
    *H04N 19/176*     (2014.01)
    *H04N 19/573*     (2014.01)

(56)            References Cited

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.

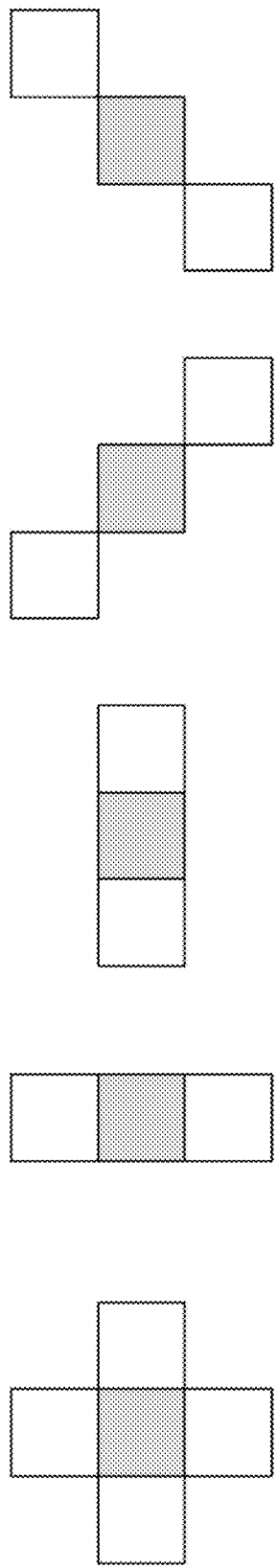
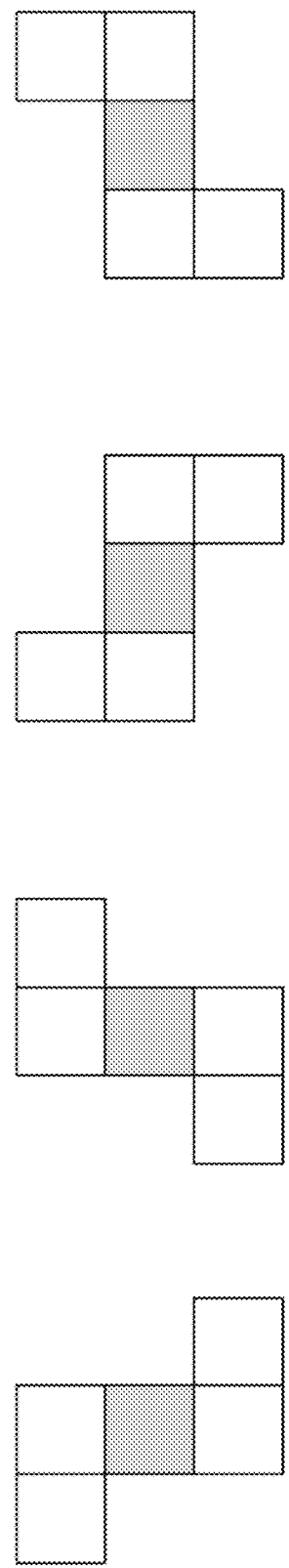
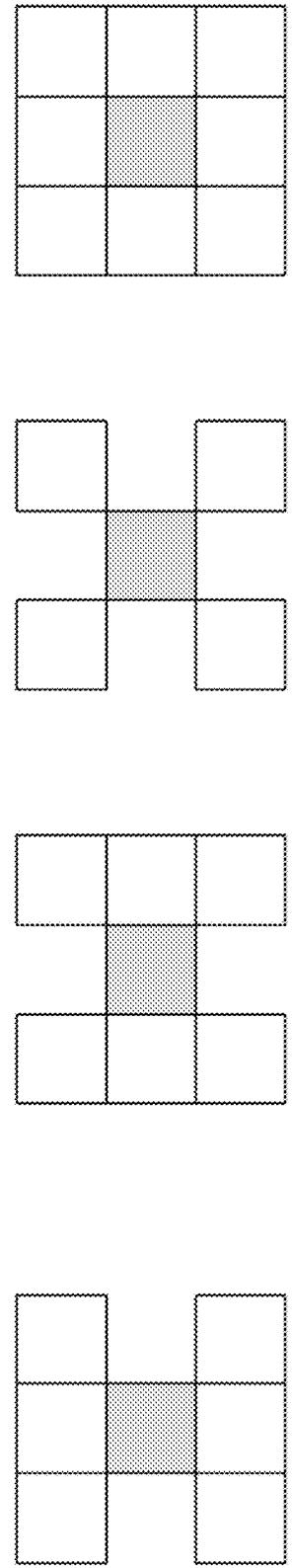

LOCAL ILLUMINATION COMPENSATION FOR BI-PREDICTION

INCORPORATION BY REFERENCE

The present application claims the benefit of priority to U.S. Provisional Application No. 63/417,930, "Local illumination compensation for bi-prediction" filed on Oct. 20, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives coded information of a current block in a current picture from a coded video bitstream, the coded information is indicative of applying a local illumination compensation (LIC) on the current block according to at least a first reference block in a first reference picture. The processing circuitry determines, for a sample in the current block, at least a first reference sample in the first reference block, the first reference sample is co-located to the sample in the current block. The processing circuitry calculates a weighted sum of a plurality of terms and an offset for the LIC according to a plurality of parameter values for a plurality of parameters used in the LIC. The plurality of parameter values includes at least a first weighting value for a first weighting that is applied to a non-linear term of the first reference sample of a kth power, k is a power index value and is not equal to 1. The processing circuitry reconstructs the sample in the current block according to the weighted sum. In some examples, the power index value is 2.

In some examples, the processing circuitry determines the plurality of parameter values for the plurality of parameters by minimizing a prediction error between neighboring reconstructed samples of the current block and predictions of the neighboring reconstructed samples by the LIC with the plurality of parameters.

In some examples, the processing circuitry decodes the first weighting value from the coded video bitstream. In some examples, the processing circuitry decodes an index from the coded video bitstream, the index indicates the first weighting value. In some examples, the first weighting value is inherited from a neighboring block of the current block.

In some examples, the plurality of parameters include the first weighting, and the offset and at least a weighting for a linear term. The processing circuitry determines first values for a first subset of the plurality of parameters, and determines second values for a second subset of the plurality of parameters by minimizing a prediction error between neighboring reconstructed samples of the current block and predictions of the neighboring reconstructed samples by the LIC with the first values for the first subset of the plurality of parameters, and the second subset of the plurality of parameters. In an example, the processing circuitry decodes the first values from the coded video bitstream. In another example, the processing circuitry decodes at least an index from the coded video bitstream, at least the index indicates the first values. In another example, the first values for the first subset of the plurality of parameters are inherited from a neighboring block of the current block.

In some examples, the first subset of the plurality of parameters include at least a linear weighting for a linear term, and the second subset of the plurality of parameters include the offset and the non-linear term.

In some examples, the first subset of the plurality of parameters include the offset, and the second subset of the plurality of parameters include at least a linear weighting for a linear term and the non-linear term.

In some examples, the coded information is indicative of applying the LIC of bi-prediction on the current block according to the first reference block in the first reference picture and a second reference block in a second reference picture. In some examples, the plurality of parameter values for the plurality of parameters include a first linear weighting value for a first linear weighting of a first linear term of the first reference sample, a second linear weighting value for a second linear weighting of a second linear term of a second reference sample that is co-located in the second reference block with regard to the sample in the current block.

In some examples, the plurality of parameter values for the plurality of parameters include first linear weighting values for first linear weightings of first linear terms respectively for first samples in the first reference block, the first samples include the first reference sample and one or more neighboring samples of the first reference sample. The first samples can form any suitable shape, such as a cross-shape, a vertical bar shape, a horizontal bar shape, a diamond shape, a rectangular shape, a diagonal shape and the like.

In some examples, the coded information is indicative of applying the LIC of bi-prediction on the current block according to the first reference block in the first reference picture and a second reference block in a second reference picture, and the plurality of parameter values for the plurality of parameters include first linear weighting values for first linear weightings of first linear terms respectively for first samples in the first reference block and second linear weighting values for second linear weightings of second linear terms respectively for second samples in the second reference block, the first samples include the first reference sample and one or more neighboring samples of the first reference sample, the second samples include a second reference sample in the second reference block and one or more neighboring samples of the second reference sample.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
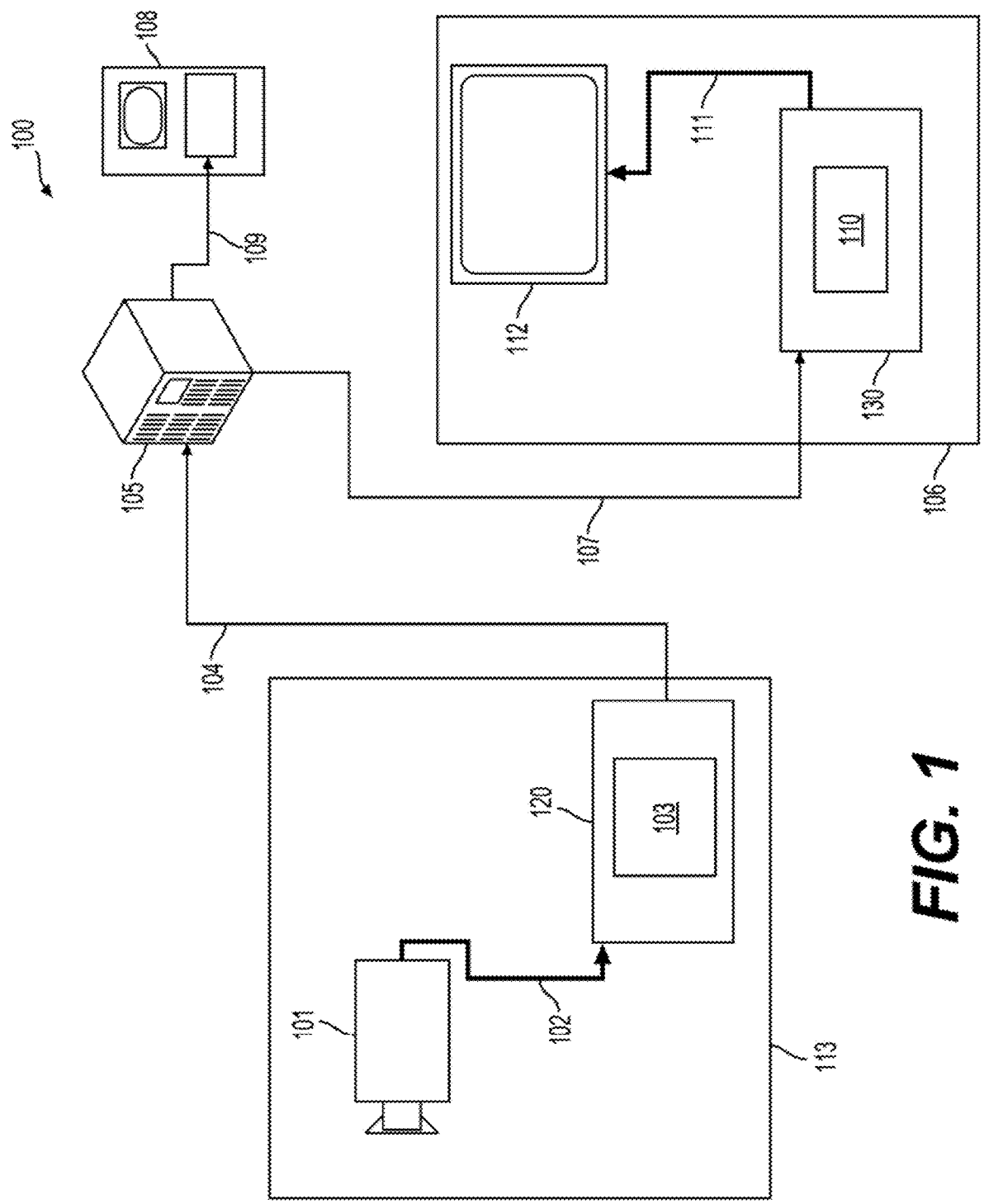
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
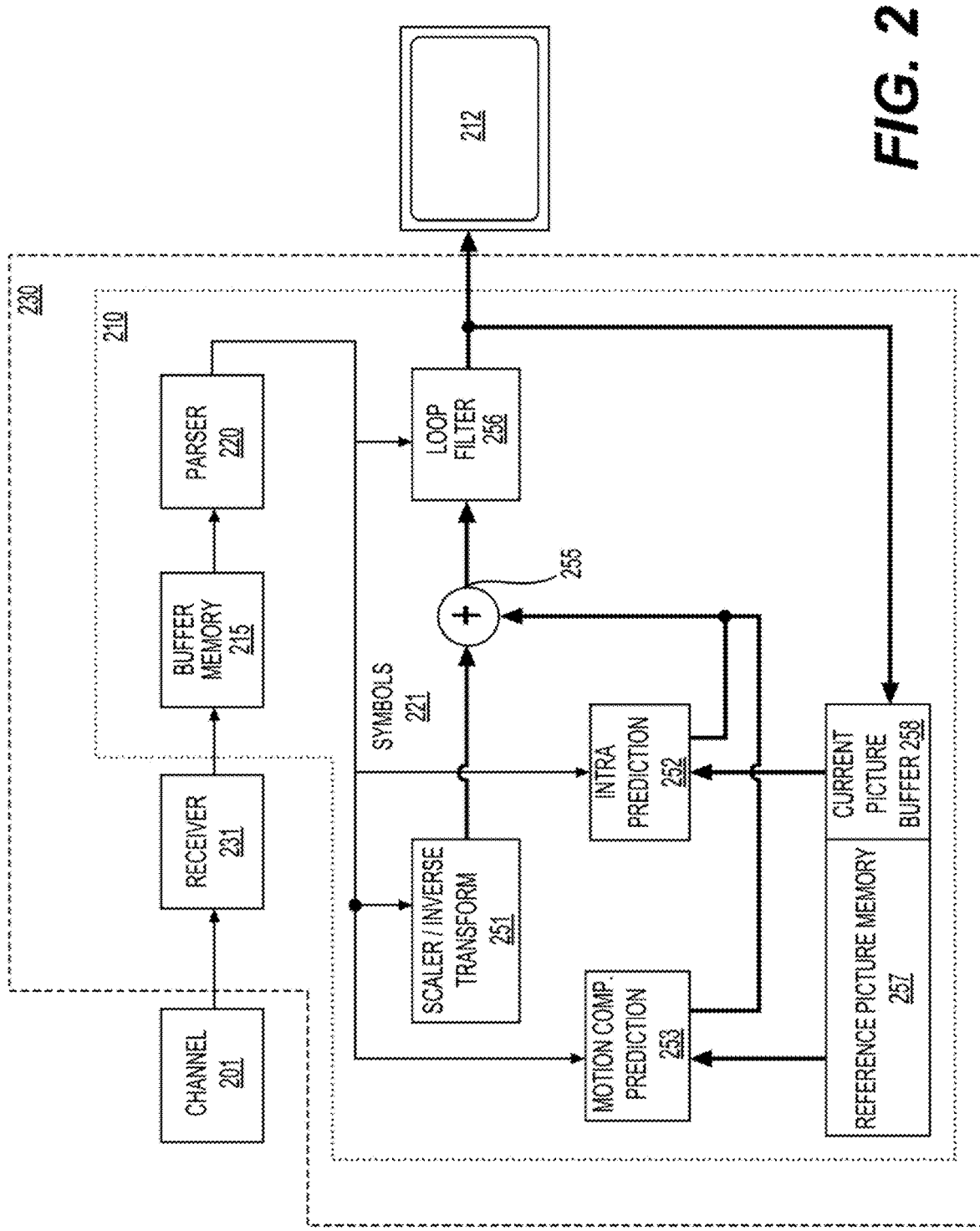
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
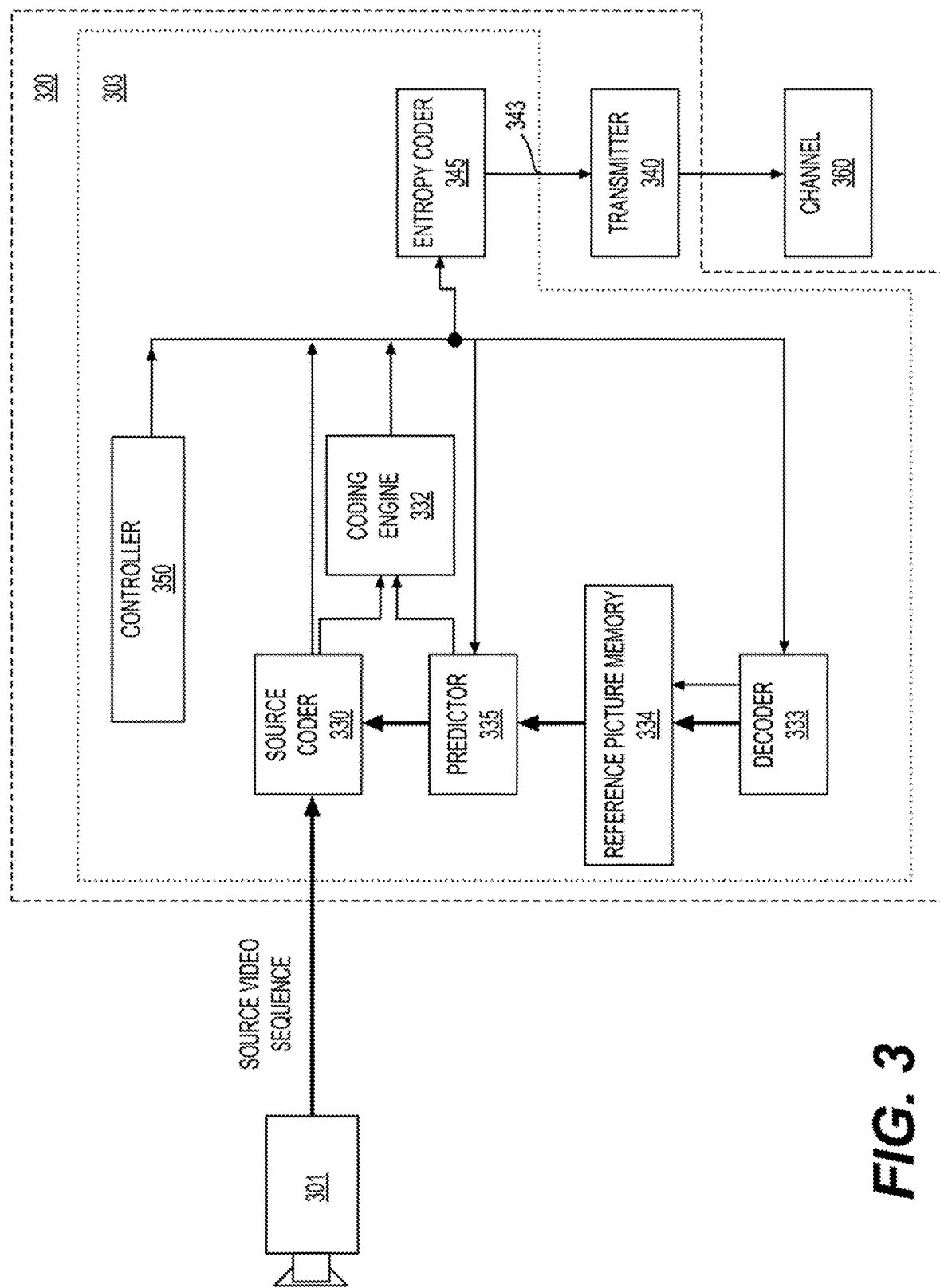
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create.

The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques that can be used with an inter prediction technique referred to as local illumination compensation (LIC). The techniques can enable the use of LIC in bi-prediction.

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like.

In some examples, local illumination compensation (LIC) is used as an inter prediction technique to model local illumination variation between a current block and a prediction block (also referred to as reference block) of the current block by using a linear function. The prediction block is in a reference picture, and can be pointed by a motion vector (MV) of the current block. The parameters of the linear function can include a scale α and an offset β, and the linear function can be represented by α×p[x, y]+s to compensate illumination changes, where p[x, y] denotes a reference sample at a location [x, y] in the reference block (also referred to as prediction block), the reference block is pointed to by MV. In some examples, the scale α and the offset s can be derived based on a template of the current block and a corresponding reference template of the reference block by using the least square method, thus no signaling overhead is required, except that an LIC flag may be signaled to indicate the use of LIC. The scale α and the offset s that are derived based on the template of the current block can be referred to as template based parameter set.

In some examples, LIC is used for uni-prediction inter CUs. In some examples, intra neighbor samples (neighboring samples that are predicted using intra prediction) of the current block can be used in LIC parameter derivation. In some examples, LIC is disabled for blocks with less than 32 luma samples. In some examples, for non subblock modes (including non affine modes), LIC parameter derivation is performed based on the template block samples of the current CU, instead of partial template block samples for the first top-left 16×16 unit. In some examples, LIC parameter derivation is performed based on partial template block samples, such as the partial template block samples for the first top-left 16×16 unit. In some examples, template samples of the reference block are determined by using motion compensation (MC) with the MV of the block without rounding it to integer-pel precision.

It is noted that the current design of LIC in ECM only applies to uni-predicted blocks, which limits the coding performance of LIC. Aspects of the disclosure provide various techniques to improve LIC performance, such as adding non-linear term, enabling LIC in bi-prediction, enabling a use of neighboring samples of a co-located sample (also referred to as applying a filter with multiple taps on the co-located sample), and the like. In some examples, for adding non-linear term, encoder/decoder determines a plurality of parameter values respectively for a plurality of parameters used in the LIC, the plurality of parameter values comprising at least a first weighting value for a first weighting of a non-linear term of a kth power, k is a power index value and is not equal to one. In some examples, k can be any suitable integer or floating number. In some examples, k is larger than one. In an example, k is a positive integer equal or larger than 2. The encoder/decoder can determine, for a sample in the current block, at least a first co-located sample (also referred to as a first reference sample) that is co-located in the first reference block with regard to the sample in the current block, and calculate a weighted sum of a plurality of terms based on the first co-located sample, the weighted sum includes the first weighting value applied on the kth power of the first co-located sample. The sample in the current block can be reconstructed according to the weighted sum and an offset value for an offset.

Some aspects of the disclosure provide techniques to enable LIC for bi-prediction, thus LIC based prediction of a current block in a current picture can incorporate two reference blocks in respective reference pictures.

According to an aspect of the disclosure, a sample in a current block in a current picture is predicted as a combination of prediction samples from two reference blocks together with an offset.

In some embodiments, the prediction of a sample in the current block is generated as a linear weighted sum of the co-located reference samples from two reference blocks and an offset, such as represented by Eq. (1):

$$p(x,y) = (\Sigma_{i=0}^{1} \alpha_i \cdot p_i(x,y)) + s \qquad \text{Eq. (1)}$$

where $\alpha_i$ refers to weighting applied on the prediction block from list i, i.e., $p_i(x, y)$, s is an offset value, (x, y) indicates the horizontal and vertical coordinate value of a sample to be predicted. For example, the coordinates are defined with regard to a top-left corner of each block. When the top-left corner of a block is defined with coordinates (0,0), p(x, y) denotes a sample at the coordinates (x, y) in the current block, $p_0(x, y)$ denotes a co-located sample (also referred to as reference sample) in a first reference block in a first reference picture from reference list 0, and $p_1(x, y)$ denotes a co-located sample (also referred to as reference sample) in a second reference block in a second reference picture from reference list 1. The first reference block and the second reference block can be determined according to MVs associated with the current block.

In an embodiment, the linear weighting values (also referred to as values of linear weightings) and offset value (also referred to as value of offset), i.e., $\alpha_i$ (e.g., including $\alpha_0$ and $\alpha_1$) and s are derived using the neighboring reconstructed samples of current block and reference blocks. In an example, neighboring reconstructed sample (template) area can be used for the derivation. The derivation can use an approach, such as least square approach, least mean-square approach, and the like to find the values of $\alpha_i$ and s that minimize a prediction error in the neighboring reconstructed sample (template) area. The template area can include above neighboring reconstructed samples and/or left neighboring reconstructed samples, and or left-above neighboring reconstructed samples. In an example, the prediction of samples in the template area can be represented using the parameters (variables) of weightings and offset ($\alpha_0$, $\alpha_1$, and s). Changes of the weightings and/or offset can change the prediction error between the reconstructed samples in the template area and the prediction of the samples in the template area using LIC. In an example, the derivation can find the values of the weightings and offset ($\alpha_0$, $\alpha_1$, and s) that minimize the prediction error.

In another embodiment, the linear weighting values, i.e., $\alpha_i$, (e.g., including true linear weighting values used in LIC or an index that indicates the true linear weighting values used in LIC) are signaled or inherited from neighboring blocks, and the offset value s is derived using the neighboring reconstructed samples of current block and reference blocks and the signaled values of $\alpha_i$. In an example, the prediction of samples in the template area can be represented using linear weightings values and a parameter (variable) of offset (s). Changes of the offset can change the prediction error between the reconstructed samples in the template area and the prediction of the samples in the template area using LIC. In an example, the derivation can find the value of the offset (s) that minimize the prediction error.

In another embodiment, the offset value s (e.g., including true offset value or an index indicative of the offset value) is signaled or inherited from neighboring blocks, and the linear weighting values, i.e., $\alpha_i$, are derived using the neighboring reconstructed samples of current block and reference blocks and the signaled value of s. In an example, the prediction of samples in the template area can be represented using the offset value s and the parameters (variables) of weightings ($\alpha_0$, and $\alpha_1$). Changes of the weightings can change the prediction error between the reconstructed samples in the template area and the prediction of the samples in the template area using LIC. In an example, the derivation can find the values of the weightings ($\alpha_0$, and $\alpha_1$) that minimize the prediction error.

In another embodiment, the linear weighting values and offset value, i.e., $\alpha_i$ and s (including the true linear weighting values and the offset value or one or more indices that indicate the linear weighting values and the offset value) are all signaled or inherited from neighboring blocks.

In some embodiments, the prediction is generated as a linear weighted sum of multiple reference samples from two reference blocks and an offset, such as represented by Eq. (2):

$$p(x,y) = (\Sigma_{i=0}^{1} \Sigma_{(x',y') \in s(x,y)} \alpha_i(x',y') \cdot p_i(x',y')) + s \qquad \text{Eq. (2)}$$

where (x, y) indicates the horizontal and vertical coordinate values of a sample to be predicted, $\alpha_i$(x', y') refers to weighting applied on the prediction sample located at (x', y') in the reference block from list i, i.e., $p_i$(x', y'), s is an offset value.

For example, the coordinates are defined with regard to a top-left corner of each block. When the top-left corner of a block is defined with coordinates (0,0), p(x, y) denotes the sample at coordinates (x, y) in the current block, $p_0$(x', y') denotes a sample at (x', y') in a first reference block in a first reference picture from reference list 0, and $p_1$(x', y') denotes a sample at (x', y') in a second reference block in a second reference picture from reference list 1, $\alpha_0$(x', y') denotes a weighting applied to $p_0$(x', y'), and $\alpha_1$(x', y') denotes a weighting applied to $p_1$(x', y').

In an embodiment, the reference samples with nonzero weighting $\alpha_i$(x, y) form a specific shape (denoted by S(x, y)) around the sample (x, y) that is co-located to the current sample to be predicted. It is noted that any suitable shapes formed of the multiple reference samples can be used.

In an example, the specific shape is cross-shape, which includes 5 nonzero weighting coefficients in each of the list 0 and list 1 reference pictures.

Figure 4:
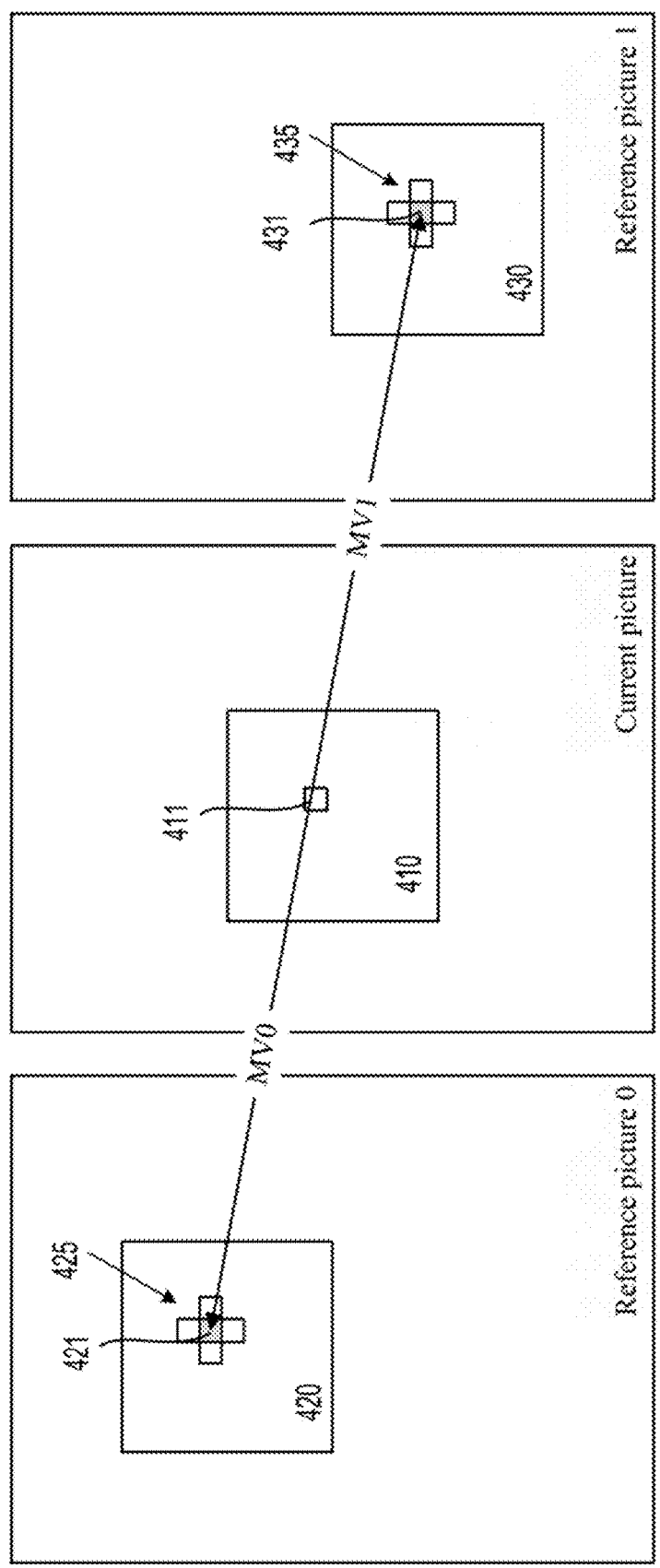
FIG. 4 shows a diagram for illustrating local illumination compensation (LIC) of bi-prediction in some examples.

FIG. 4 shows a diagram for illustrating LIC bi-prediction in some examples. In FIG. 4, a current picture includes a current block (410). A first motion vector MV0 of the current block points to a first reference block (420) in a first reference picture (e.g., reference picture 0), and a second motion vector MV1 of the current block points to a second reference block (430) in a second reference picture (e.g., reference picture 1). For a sample (411) in the current block (410), and the reference block (420) includes a co-located (also referred to as collocated or reference) sample (421), and the reference block (430) also includes a co-located (also referred to as collocated or reference) sample (431). In an example, the co-located samples corresponding to the sample (411) can be identified by the first motion vector MV0 and the second motion vector MV1. In an example, to predict the sample (411), five samples (425) in the first reference block (420) that form a cross-shape, and five samples (435) in the second reference block (430) that form a cross-shape are used, for example according to the Eq. (2) to generate a prediction for the sample (411).

In another example, the specific shape is a vertical bar shape with vertical 3 taps (e.g., three nonzero weighting coefficients in vertical direction) in each of the list 0 and list 1 reference pictures.

Figure 5:
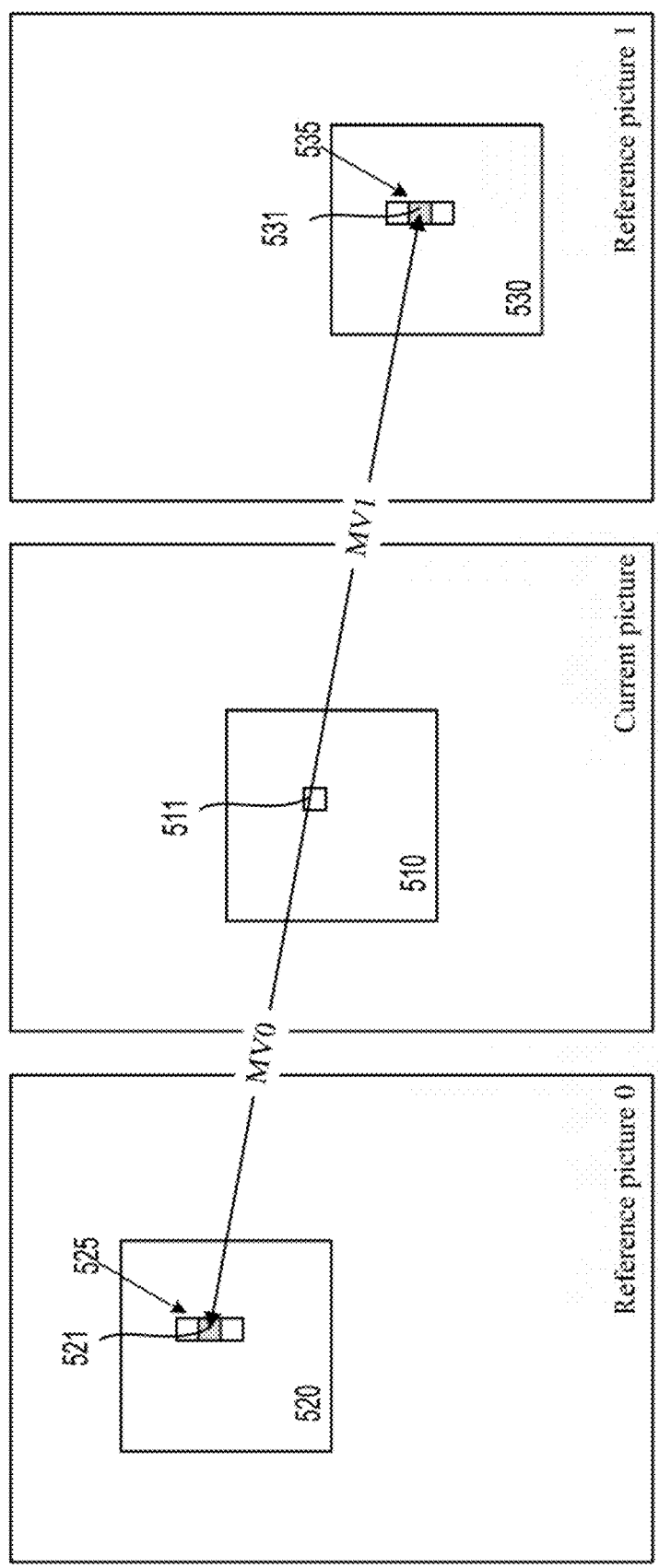
FIG. 5 shows a diagram for illustrating LIC bi-prediction in some examples.

FIG. 5 shows a diagram for illustrating LIC bi-prediction in some examples. In FIG. 5, a current picture includes a current block (510). A first motion vector MV0 of the current block points to a first reference block (520) in a first reference picture (e.g., reference picture 0), and a second motion vector MV1 of the current block points to a second reference block (530) in a second reference picture (e.g., reference picture 1). For a sample (511) in the current block (510), and the reference block (520) includes a co-located (also referred to as collocated or reference) sample (521), and the reference block (530) also includes a co-located (also referred to as collocated or reference) sample (531). In an example, the co-located samples corresponding to the sample (511) can be identified by the first motion vector MV0 and the second motion vector MV1. In an example, to predict the sample (511), three samples (525) in the first reference block (520) that form a vertical bar, and three samples (535) in the second reference block (530) that form a vertical bar are used, for example according to the Eq. (2) to generate a prediction for the sample (511).

In another, the specific shape is a horizontal bar shape with horizontal 3 taps (e.g., three nonzero weighting coefficients in horizontal direction) in each of the list 0 and list 1 reference pictures.

Figure 6:
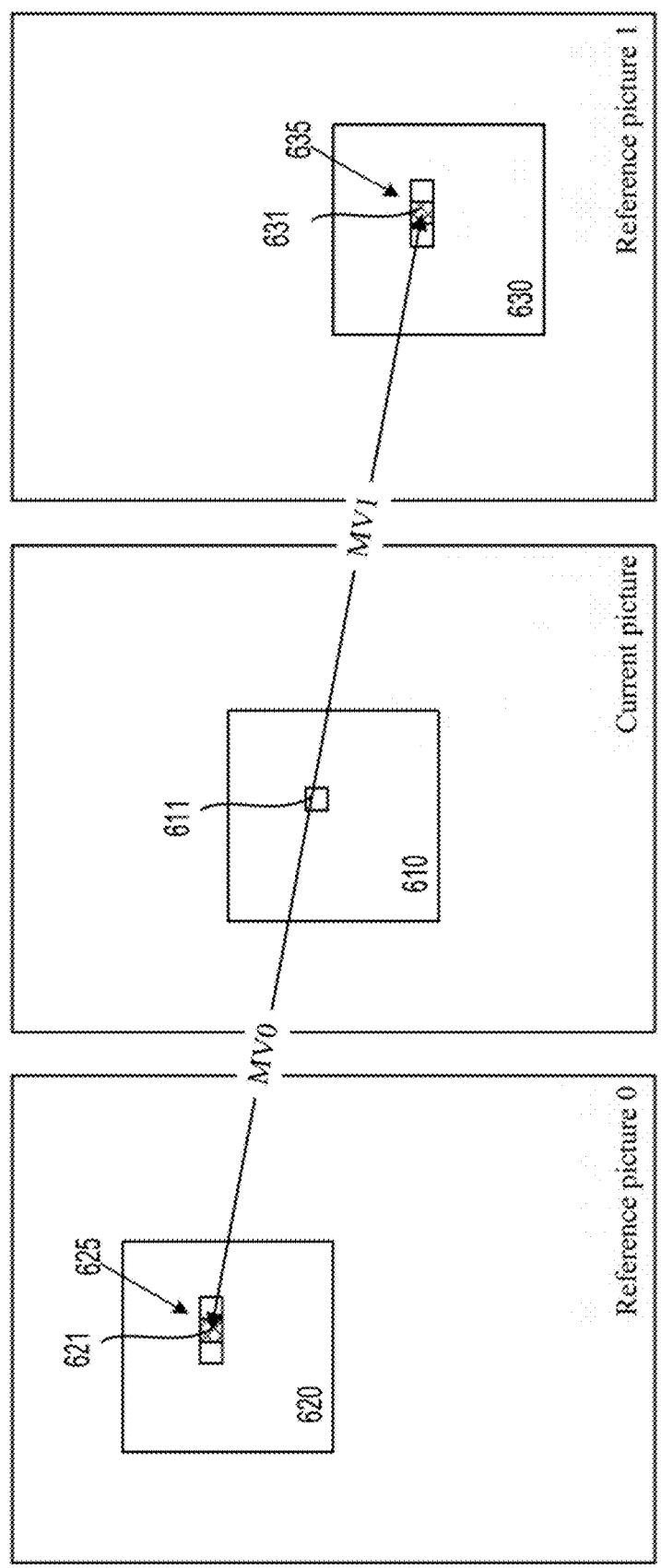
FIG. 6 shows a diagram for illustrating LIC bi-prediction in some examples.

FIG. 6 shows a diagram for illustrating LIC bi-prediction in some examples. In FIG. 6, a current picture includes a current block (610). A first motion vector MV0 of the current block points to a first reference block (620) in a first reference picture (e.g., reference picture 0), and a second motion vector MV1 of the current block points to a second reference block (630) in a second reference picture (e.g., reference picture 1). For a sample (611) in the current block (610), and the reference block (620) includes a co-located (also referred to as collocated or reference) sample (621), and the reference block (630) also includes a co-located (also referred to as collocated or reference) sample (631). In an example, the co-located samples corresponding to the sample (611) can be identified by the first motion vector MV0 and the second motion vector MV1. In an example, to predict the sample (611), three samples (625) in the first reference block (620) that form a horizontal bar, and three samples (635) in the second reference block (630) that form a horizontal bar, are used, for example according to the Eq. (2) to generate a prediction for the sample (611).

It is noted that any suitable shapes of samples in the reference pictures can be used in the LIC bi-prediction.

Figure 7O:
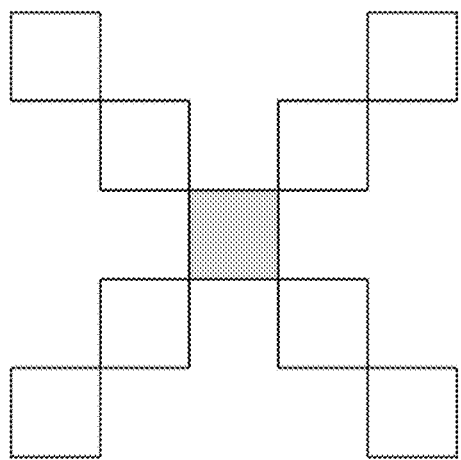
FIGS. 7A-7P show some shapes of samples that can be used in the LIC in some examples.
Figure 7N:
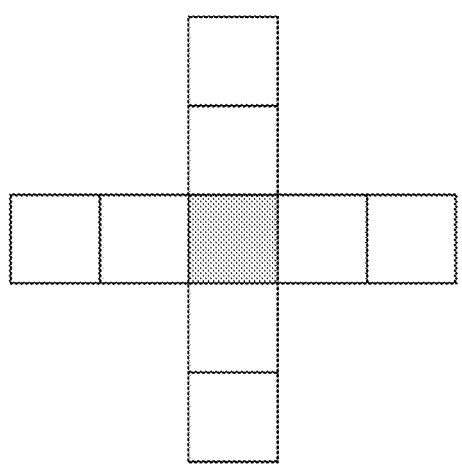
Figure 7P:
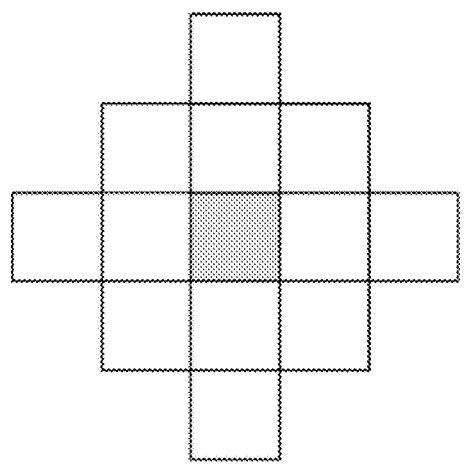

FIGS. 7A-7P show some shapes of samples that can be used in the LIC. The gray colored sample in each shape indicates a co-located (reference) sample in the reference picture corresponding to the sample to be prediction in the current picture. FIG. 7A and FIG. 7N show shapes referred to as a cross-shape in an example. FIG. 7B shows a shape referred to as a vertical bar shape. FIG. 7C shows a shape referred to as a horizontal bar shape. FIG. 7D-7E show shapes referred to as diagonal shapes. FIG. 7F-7I show shapes that are referred to as Z shapes. FIG. 7J shows a shape that is referred to as I shape. FIG. 7K shows a shape that is referred to as H shape. FIG. 7L and FIG. 7O show shapes that is referred to as X shape. FIG. 7M shows a shape that is referred to as a rectangular shape. FIG. 7P show a shape that is referred to as a diamond shape.

In an embodiment, the values of the linear weighting and offset values, i.e., $\alpha_i(x', y')$ and s are derived using the neighboring reconstructed samples of current block and reference blocks. In an example, neighboring reconstructed sample (template) area can be used for the derivation. The derivation can use an approach, such as least square approach, least mean-square approach, and the like to find the values of $\alpha_i$ and s that minimize a prediction error in the neighboring reconstructed sample (template) area. The template area can include above neighboring reconstructed samples and/or left neighboring reconstructed samples, and or left-above neighboring reconstructed samples.

In another embodiment, the values (or an index to the values) of the linear weighting, i.e., $\alpha_i(x', y')$, are signaled or inherited from neighboring blocks, and the offset value s is derived using the neighboring reconstructed samples of current block and reference blocks and the signaled value of $\alpha_i(x', y')$.

In another embodiment, the offset value s (or an index to the offset value) is signaled or inherited from neighboring blocks, and values of the linear weighting, i.e., $\alpha_i(x', y')$, are derived using the neighboring reconstructed samples of current block and reference blocks and the signaled value of s.

In another embodiment, the values (or an index to the values) of the linear weighting and the offset value, i.e., $\alpha_i(x', y')$ and s are all signaled or inherited from neighboring blocks.

In some embodiments, the prediction is generated as a non-linear weighted sum of the co-located reference samples from two reference blocks and an offset, such as represented by Eq. (3):

$$p(x,y) = (\Sigma_{i=0}^{1} \alpha_i \cdot p_i(x,y) + \beta_i \cdot p_i(x,y)^k) + s \qquad \text{Eq. (3)}$$

where $\alpha_i$ refers to linear weighting applied on the prediction block from list i, i.e., $p_i(x, y)$, $\beta_i$ refers to the weighting (also referred to as non-linear weighting) applied on the non-linear term, and k is a pre-defined power index value, s is an offset value, (x, y) indicates the horizontal and vertical coordinate value of a sample to be predicted. It is noted that k is a positive integer that is equal to or larger than 2. In an example, k is equal to 2. In another example, k is equal to 3.

In an embodiment, the values of the linear weighting and non-linear weighting and the offset value, i.e., $\alpha_i$, $\beta_i$ and s are derived using the neighboring reconstructed samples of current block and reference blocks. An example of the derivation is using an approach, such as least square approach, least mean-square approach, and the like to find the values of $\alpha_i$, $\beta_i$ and s that minimize the prediction error in the neighboring reconstructed sample (template) area. In an example, neighboring reconstructed sample (template) area can be used for the derivation. The derivation can use least square approach to find the values of $\alpha_i$, $\beta_i$ and s that minimize a prediction error in the neighboring reconstructed sample (template) area. The template area can include above neighboring reconstructed samples and/or left neighboring reconstructed samples, and or left-above neighboring reconstructed samples. In an example, the prediction of samples in the template area can be represented using the parameters (variables) of linear weightings, non-linear weightings and offset ($\alpha_0$, $\alpha_1$, $\beta_0$, $\beta_1$ and s). Changes of the linear weightings, non-linear weightings and/or offset can change the prediction error between the reconstructed samples in the template area and the prediction of the samples in the template area using LIC. In an example, the derivation can find the values of the weightings and offset ($\alpha_0$, $\alpha_1$, $\beta_0$, $\beta_1$ and s) that minimize the prediction error.

In another embodiment, the values (or an index to the values) of the linear weighting, i.e., $\alpha_i$, are signaled or inherited from neighboring blocks, and the non-linear weighting, i.e., $\beta_i$, and offset value s is derived using the neighboring reconstructed samples of current block and reference blocks and the signaled value of $\alpha_i$. In an example, the prediction of samples in the template area can be represented using the values of the linear weighting, parameters (variables) of non-linear weightings and offset ($\beta_0$, $\beta_1$ and s). Changes of the non-linear weightings and/or offset can change the prediction error between the reconstructed samples in the template area and the prediction of the samples in the template area using LIC. In an example, the derivation can find the values of the non-linear weightings and offset ($\beta_0$, $\beta_1$ and s) that minimize the prediction error.

In another embodiment, the offset value s (or an index to the offset value) is signaled or inherited from neighboring blocks, and the linear and non-linear weighting, i.e., $\alpha_i$ and $\beta_i$, are derived using the neighboring reconstructed samples of current block and reference blocks and the signaled offset value of s. In an example, the prediction of samples in the template area can be represented using the offset value, the parameters (variables) of linear weightings, non-linear weightings and offset ($\alpha_0$, $\alpha_1$, $\beta_0$, $\beta_1$). Changes of the linear weightings, and/or non-linear weightings can change the prediction error between the reconstructed samples in the template area and the prediction of the samples in the template area using LIC. In an example, the derivation can find the values of the weightings ($\alpha_0$, $\alpha_1$, $\beta_0$, $\beta_1$) that minimize the prediction error.

In another embodiment, the values (or an index to the values) of the linear weighting and offset values, i.e., $\alpha_i$, $\beta_i$, and s are all signaled or inherited from neighboring blocks.

In some embodiments, the prediction is generated as a combination of a linear weighted sum of multiple reference samples from two reference blocks, a non-linear weighted sum of the co-located reference samples from two reference blocks and an offset, such as represented by Eq. (4):

$$p(x,y)=(\Sigma_{i=0}^1((\Sigma_{(x',y')\in s(x,y)}(\alpha_i(x',y')\cdot p_i(x',y')))+\beta_i p_i(x,y)^k))+s \quad (4)$$

where $\alpha_i$ refers to linear weighting applied on the prediction block from list i, i.e., $p_i(x, y)$, $\beta_i$ refers to the non-linear weighting applied on the non-linear term, and k is a predefined power index value, s is an offset value, (x, y) indicates the horizontal and vertical coordinate value of a sample to be predicted. It is noted that k is a positive integer that is larger than 1. In an example, k is equal to 2.

In an embodiment, the reference samples with nonzero weighting $\alpha_i(x, y)$ form a specific shape, i.e., $S(x, y)$ around the sample (x, y) that is co-located to the current sample to be predicted. Example shape include, but not limited to cross shape, diamond shape, rectangular shape, vertical shape, horizontal shape. FIGS. 7A-7P show some of the shapes that can be used for the reference samples with nonzero weighting $\alpha_i(x, y)$.

In an embodiment, the values of the linear weighting, i.e., $\alpha_i(x', y')$, the values of non-linear weighting, i.e., $\beta_i$, and offset value s are derived using the neighboring reconstructed samples of current block and reference blocks. An example of the derivation is using least mean-square approach to find the values of $\alpha_i(x', y')$, $\beta_i$, and s that minimize the prediction error in the neighboring reconstructed sample (template) area.

In another embodiment, the values (or an index to the values) of the linear weighting, i.e., $\alpha_i(x', y')$, are signaled or inherited from neighboring blocks, and the values of non-linear weighting, i.e., $\beta_i$ and the offset value s are derived using the neighboring reconstructed samples of current block and reference blocks and the signaled value of $\alpha_i(x', y')$.

In another embodiment, the offset value s (or an index to the offset value) is signaled or inherited from neighboring blocks, and the values of linear weighting, i.e., $\alpha_i(x', y')$, and values of non-linear weighting, i.e., $\beta_i$, are derived using the neighboring reconstructed samples of current block and reference blocks and the signaled value of s.

In another embodiment, the values (or an index to the values) of the linear weighting, i.e., $\alpha_i(x', y')$, the values of non-linear weighting, i.e., $\beta_i$ and the offset value s are all signaled or inherited from neighboring blocks.

Figure 8:
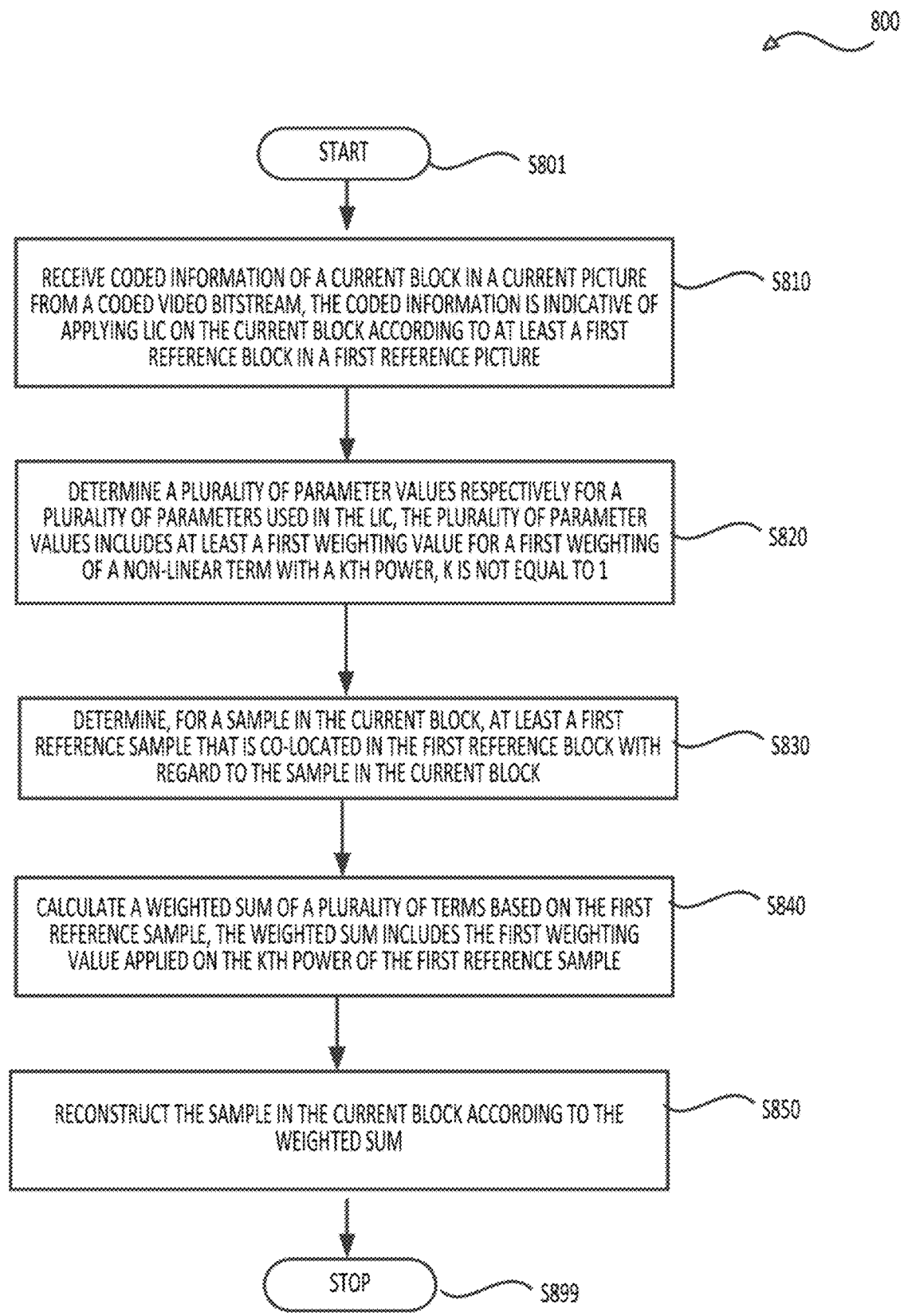
FIG. 8 shows a flow chart outlining another process according to some embodiment of the disclosure.

FIG. 8 shows a flow chart outlining a process (800) according to an embodiment of the disclosure. The process (800) can be used in a video decoder. In various embodiments, the process (800) is executed by processing circuitry, such as the processing circuitry that performs functions of the video decoder (110), the processing circuitry that performs functions of the video decoder (210), and the like. In some embodiments, the process (800) is implemented in software instructions, thus when the processing circuitry executes the software instructions, the processing circuitry performs the process (800). The process starts at (S801) and proceeds to (S810).

At (S810), coded information of a current block in a current picture is received from a coded video bitstream, the coded information is indicative of applying local illumination compensation (LIC) on the current block according to at least a first reference block in a first reference picture. The first reference block is pointed by a first motion vector of the current block.

At (S820), a plurality of parameter values respectively for a plurality of parameters to use in the LIC are determined. The plurality of parameter values include at least a first weighting value for a first weighting of a non-linear term with a kth power, k is power index value and is not equal to one. In some examples, k can be any suitable integer or floating number. In some examples, k is larger than one. In an example, k is a positive integer equal to or larger than 2.

At (S830), for a sample in the current block, at least a first reference sample that is co-located in the first reference block with regard to the sample in the current block is determined. The first reference sample is also referred to as a first co-located sample in an example.

At (S840), a weighted sum of a plurality of terms and an offset is calculated based on the first reference sample. The weighted sum includes the first weighting value applied on the kth power of the first reference sample, such as in Eq. (3).

At (S850), the sample in the current block is reconstructed according to the weighted sum, such as in Eq. (3).

In some examples, the power index value k is one of 2 or 3.

To determine the plurality of parameter values, in some examples, the plurality of parameter values for the plurality of parameters are determined by minimizing a prediction error between neighboring reconstructed samples of the current block and predictions of the neighboring reconstructed samples by the LIC with the plurality of parameters.

In an example, the first weighting value is decoded directly from the coded video bitstream. In another example, an index is decoded from the coded video bitstream, the index indicates the first weighting value from a plurality of weighting value candidates. In another example, the first weighting value is inherited from a neighboring block of the current block.

In some examples, the plurality of parameters include the first weighting, the offset and at least a weighting for a linear term. In an example, first values for a first subset of the plurality of parameters are determined. Second values for a second subset of the plurality of parameters are determined by minimizing a prediction error between neighboring reconstructed samples of the current block and predictions of the neighboring reconstructed samples by the LIC with the first values for the first subset of the plurality of parameters, and the second subset of the plurality of parameters. In an example, the first values are decoded directly from the coded video bitstream. In another example, at least an index is decoded from the coded video bitstream, at least the index indicates the first values. In another example, the first values for the first subset of the plurality of parameters are inherited from a neighboring block of the current block.

In some examples, the first subset of the plurality of parameters includes linear weightings for linear terms, and the second subset of the plurality of parameters includes the offset and the non-linear term.

In some examples, the first subset of the plurality of parameters includes the offset, and the second subset of the plurality of parameters includes linear weightings for linear terms and the non-linear term.

In some examples, the coded information is indicative of applying the LIC of bi-prediction on the current block according to the first reference block in the first reference picture and a second reference block in a second reference picture.

In some examples, the plurality of parameter values for the plurality of parameters include a first linear weighting value for a first linear weighting of a first linear term of the first reference sample, a second linear weighting value for a second linear weighting of a second linear term of a second reference sample that is co-located in the second reference block with regard to the sample in the current block.

In some examples, the plurality of parameter values for the plurality of parameters includes first linear weighting values for first linear weightings of first linear terms respectively for first samples in the first reference block, the first samples include the first reference sample and one or more neighboring samples of the reference sample. The first samples form any suitable shape, such as a cross-shape, a vertical bar shape, a horizontal bar shape, a diamond shape, a rectangular shape, and a diagonal shape.

In some examples, the coded information is indicative of applying the LIC of bi-prediction on the current block according to the first reference block in the first reference picture and a second reference block in a second reference picture, and the plurality of parameter values for the plurality of parameters include first linear weighting values for first linear weightings of first linear terms respectively for first samples in the first reference block and second linear weighting values for second linear weightings of second linear terms respectively for second samples in the second reference block, the first samples include the first reference sample and one or more neighboring samples of the first reference sample, the second samples include a second reference sample in the second reference block and one or more neighboring samples of the second reference sample.

Then, the process proceeds to (S899) and terminates.

The process (800) can be suitably adapted. Step(s) in the process (800) can be modified and/or omitted. Additional step(s) can be added. Any suitable order of implementation can be used.

Figure 9:
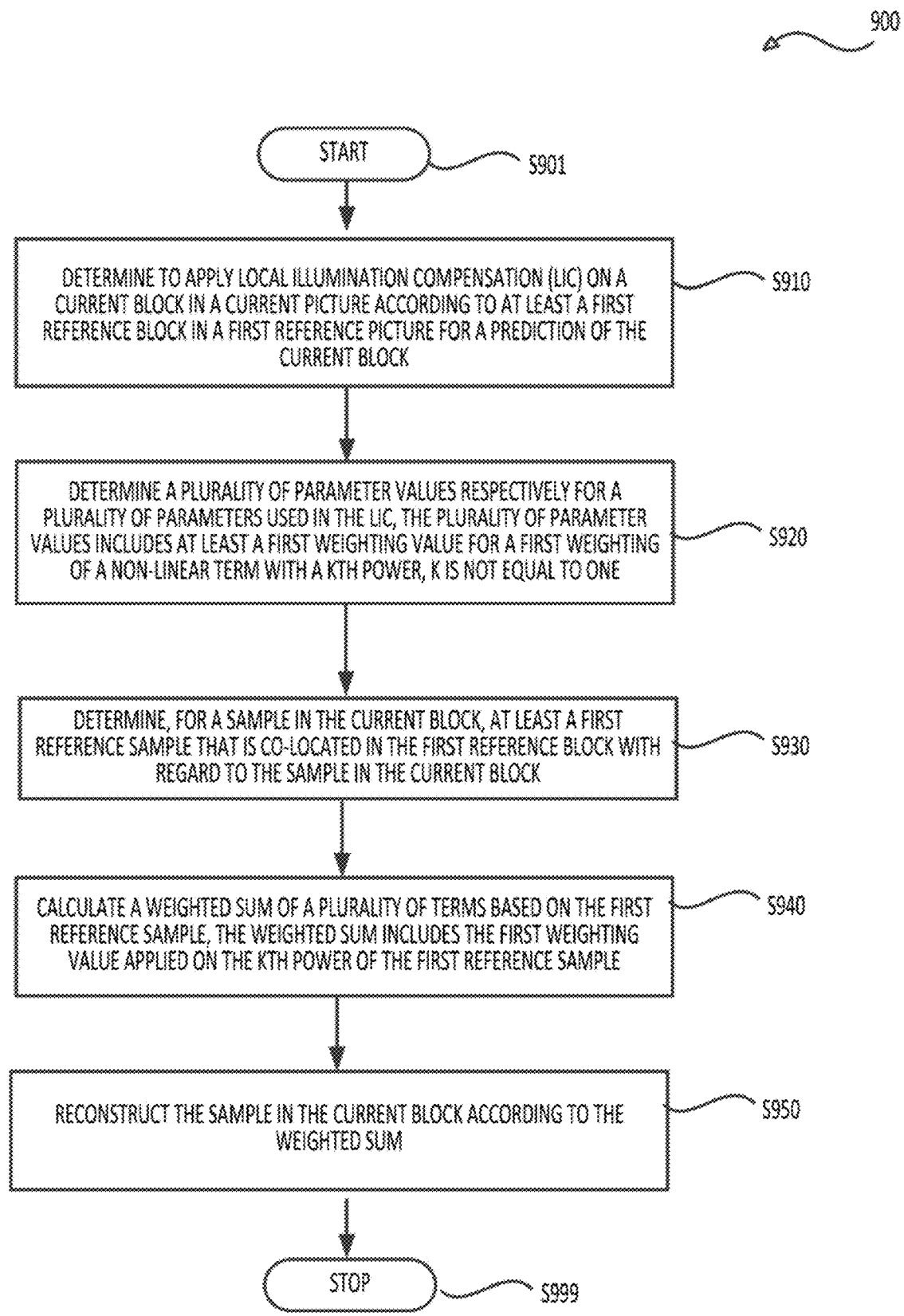
FIG. 9 shows a flow chart outlining a process according to some embodiment of the disclosure.

FIG. 9 shows a flow chart outlining a process (900) according to an embodiment of the disclosure. The process (900) can be used in a video encoder. In various embodiments, the process (900) is executed by processing circuitry, such as the processing circuitry that performs functions of the video encoder (103), the processing circuitry that performs functions of the video encoder (303), and the like. In some embodiments, the process (900) is implemented in software instructions, thus when the processing circuitry executes the software instructions, the processing circuitry performs the process (900). The process starts at (S901) and proceeds to (S910).

At (S910), to apply a local illumination compensation (LIC) on a current block in a current picture according to at least a first reference block in a first reference picture for a prediction of the current block is determined.

At (S920), a plurality of parameter values respectively for a plurality of parameters to use in the LIC is determined. The plurality of parameter values include at least a first weighting value for a first weighting of a non-linear term with a kth power, k is a power index value and is not equal to one. In some examples, k can be any suitable integer or floating number. In some examples, k is larger than one. In an example, k is a positive integer equal or larger than 2.

At (S930), for a sample in the current block, at least a first reference sample that is co-located in the first reference block with regard to the sample in the current block is determined.

At (S940), a weighted sum of a plurality of terms is calculated based on the first reference sample, the weighted sum includes the first weighting value applied on the kth power of the first reference sample, such as in Eq. (3).

At (S950), the sample in the current block is reconstructed according to the weighted sum and an offset value for an offset, such as in Eq. (3).

In some examples, the power index value k is one of 2 or 3.

To determine the plurality of parameter values, in some examples, the plurality of parameter values for the plurality of parameters are determined by minimizing a prediction error between neighboring reconstructed samples of the current block and predictions of the neighboring reconstructed samples by the LIC with the plurality of parameters.

In an example, the first weighting value is encoded into the coded video bitstream. In another example, an index is encoded into the coded video bitstream, the index indicates the first weighting value from a plurality of weighting value candidates. In another example, the first weighting value is inherited from a neighboring block of the current block.

In some examples, the plurality of parameters includes the first weighting, the offset and at least a weighting for a linear term. In an example, first values for a first subset of the plurality of parameters are determined. Second values for a second subset of the plurality of parameters are determined by minimizing a prediction error between neighboring reconstructed samples of the current block and predictions of the neighboring reconstructed samples by the LIC with the first values for the first subset of the plurality of parameters, and the second subset of the plurality of parameters. In an example, the first values are encoded into the coded video bitstream. In another example, at least an index is encoded into the coded video bitstream, at least the index indicates the first values. In another example, the first values for the first subset of the plurality of parameters are inherited from a neighboring block of the current block.

In some examples, the first subset of the plurality of parameters includes linear weightings for linear terms, and the second subset of the plurality of parameters includes the offset and the non-linear term.

In some examples, the first subset of the plurality of parameters includes the offset, and the second subset of the plurality of parameters includes linear weightings for linear terms and the non-linear term.

In some examples, to apply the LIC of bi-prediction on the current block according to the first reference block in the first reference picture and a second reference block in a second reference picture is determined.

In some examples, the plurality of parameter values for the plurality of parameters include a first linear weighting value for a first linear weighting of a first linear term of the first reference sample, a second linear weighting value for a second linear weighting of a second linear term of a second reference sample that is co-located in the second reference block with regard to the sample in the current block.

In some examples, the plurality of parameter values for the plurality of parameters includes first linear weighting values for first linear weightings of first linear terms respectively for first samples in the first reference block, the first samples include the first reference sample and one or more neighboring samples of the first reference sample. The first samples form any suitable shape, such as a cross-shape, a vertical bar shape, a horizontal bar shape, a diamond shape, a rectangular shape, and a diagonal shape.

In some examples, to apply the LIC of bi-prediction on the current block according to the first reference block in the first reference picture and a second reference block in a second reference picture is determined, and the plurality of parameter values for the plurality of parameters include first linear weighting values for first linear weightings of first linear terms respectively for first samples in the first reference block and second linear weighting values for second linear weightings of second linear terms respectively for second samples in the second reference block, the first samples include the first reference sample and one or more neighboring samples of the first reference sample, the second samples include a second reference sample in the second reference block and one or more neighboring samples of the second reference sample.

Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
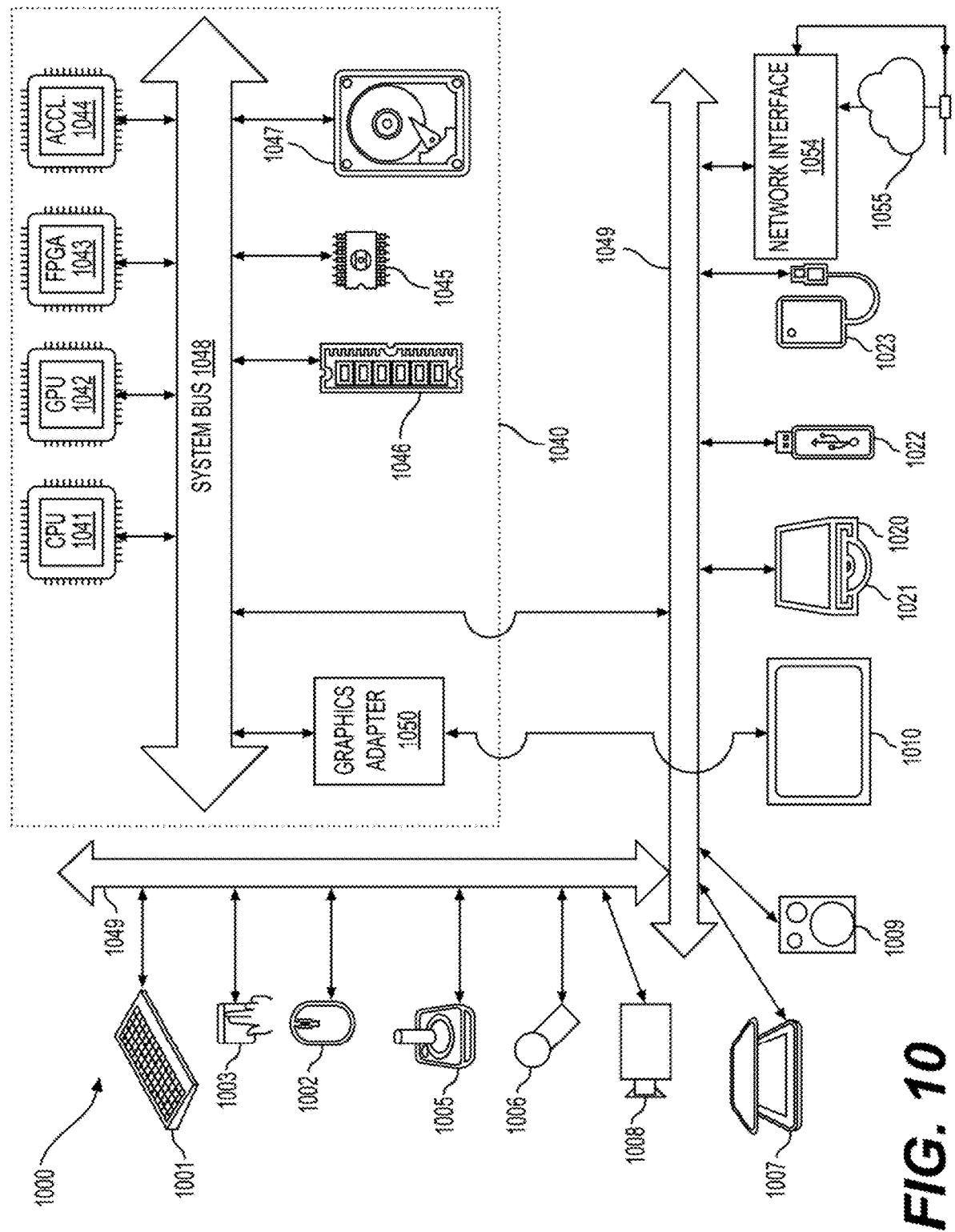
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
   receiving coded information of a current block in a current picture from a coded video bitstream, the coded information being indicative of applying a local illumination compensation (LIC) on the current block according to at least a first reference block in a first reference picture;
   determining, for a sample in the current block, at least a first reference sample in the first reference block, the first reference sample being co-located to the sample in the current block;
   calculating a weighted sum of a plurality of terms and an offset for the LIC according to a plurality of parameter values for a plurality of parameters used in the LIC, the plurality of parameter values comprising at least a first weighting value for a first weighting that is applied to a non-linear term of the first reference sample of a kth power, wherein k comprises a power index value that is equal to 2; and
   reconstructing the sample in the current block according to the weighted sum.

2. The method of claim 1, further comprising:
   determining the plurality of parameter values for the plurality of parameters by minimizing a prediction error between neighboring reconstructed samples of the current block and predictions of the neighboring reconstructed samples by the LIC with the plurality of parameters.

3. The method of claim 1, further comprising at least one of:
   decoding the first weighting value from the coded video bitstream;
   decoding an index from the coded video bitstream, the index indicating the first weighting value; and
   inheriting the first weighting value from a neighboring block of the current block.

4. The method of claim 1, wherein the plurality of parameters comprises the first weighting, and the offset and at least a weighting for a linear term, the method further comprises:
   determining first values for a first subset of the plurality of parameters; and
   determining second values for a second subset of the plurality of parameters by minimizing a prediction error between neighboring reconstructed samples of the current block and predictions of the neighboring reconstructed samples by the LIC with the first values for the first subset of the plurality of parameters, and the second subset of the plurality of parameters.

5. The method of claim 4, wherein the determining the first values for the first subset of the plurality of parameters comprises at least one of:
  decoding the first values from the coded video bitstream;
  decoding at least an index from the coded video bitstream, at least the index indicating the first values; and
  inheriting the first values for the first subset of the plurality of parameters from a neighboring block of the current block.

6. The method of claim 4, wherein the first subset of the plurality of parameters comprises linear weightings for linear terms, and the second subset of the plurality of parameters comprises the offset and the non-linear term.

7. The method of claim 4, wherein the first subset of the plurality of parameters comprises the offset, and the second subset of the plurality of parameters comprises linear weightings for linear terms and the non-linear term.

8. The method of claim 1, wherein the coded information is indicative of applying the LIC of bi-prediction on the current block according to the first reference block in the first reference picture and a second reference block in a second reference picture.

9. The method of claim 8, wherein the plurality of parameter values for the plurality of parameters comprises a first linear weighting value for a first linear weighting of a first linear term of the first reference sample, a second linear weighting value for a second linear weighting of a second linear term of a second reference sample that is co-located in the second reference block with regard to the sample in the current block.

10. The method of claim 1, wherein the plurality of parameter values for the plurality of parameters comprises first linear weighting values for first linear weightings of first linear terms respectively for first samples in the first reference block, the first samples comprise the first reference sample and one or more neighboring samples of the first reference sample.

11. The method of claim 10, wherein the first samples form at least one of:
  a cross-shape;
  a vertical bar shape;
  a horizontal bar shape;
  a diamond shape;
  a rectangular shape; and
  a diagonal shape.

12. The method of claim 1, wherein the coded information is indicative of applying the LIC of bi-prediction on the current block according to the first reference block in the first reference picture and a second reference block in a second reference picture, and the plurality of parameter values for the plurality of parameters comprises first linear weighting values for first linear weightings of first linear terms respectively for first samples in the first reference block and second linear weighting values for second linear weightings of second linear terms respectively for second samples in the second reference block, the first samples comprise the first reference sample and one or more neighboring samples of the first reference sample, the second samples comprise a second reference sample in the second reference block and one or more neighboring samples of the second reference sample.

13. A method of video encoding, comprising:
  determining a local illumination compensation (LIC) is to be applied on a current block in a current picture according to at least a first reference block in a first reference picture;
  determining, for a sample in the current block, at least a first reference sample in the first reference block, the first reference sample being co-located to the sample in the current block;
  calculating a weighted sum of a plurality of terms and an offset for the LIC according to a plurality of parameter values for a plurality of parameters used in the LIC, the plurality of parameter values comprising at least a first weighting value for a first weighting that is applied to a non-linear term of the first reference sample of a kth power, wherein k comprises a power index value that is equal to 2;
  encoding, in a video bitstream, information indicating that the LIC is applied to the current block; and
  encoding, in the video bitstream, the sample in the current block according to the weighted sum.

14. The method of claim 13, further comprising:
  determining the plurality of parameter values for the plurality of parameters by minimizing a prediction error between neighboring reconstructed samples of the current block and predictions of the neighboring reconstructed samples by the LIC with the plurality of parameters.

15. The method of claim 13, further comprising at least one of:
  encoding the first weighting value in the video bitstream;
  encoding an index in the video bitstream, the index indicating the first weighting value; and
  inheriting the first weighting value from a neighboring block of the current block.

16. The method of claim 13, wherein the plurality of parameters comprises the first weighting, and the offset and at least a weighting for a linear term, the method further comprises:
  determining first values for a first subset of the plurality of parameters; and
  determining second values for a second subset of the plurality of parameters by minimizing a prediction error between neighboring reconstructed samples of the current block and predictions of the neighboring reconstructed samples by the LIC with the first values for the first subset of the plurality of parameters, and the second subset of the plurality of parameters.

17. The method of claim 16, wherein the determining the first values for the first subset of the plurality of parameters comprises at least one of:
  encoding the first values in the video bitstream;
  encoding at least an index in the video bitstream, at least the index indicating the first values; and
  inheriting the first values for the first subset of the plurality of parameters from a neighboring block of the current block.

18. The method of claim 16, wherein the first subset of the plurality of parameters comprises linear weightings for linear terms, and the second subset of the plurality of parameters comprises the offset and the non-linear term.

19. The method of claim 16, wherein the first subset of the plurality of parameters comprises the offset, and the second subset of the plurality of parameters comprises linear weightings for linear terms and the non-linear term.

20. A non-transitory computer-readable storage medium storing a video bitstream that is generated by a video encoding method, the video encoding method comprising:
  signaling, in a video bitstream, information indicating a local illumination compensation (LIC) is applied on a current block in a current picture according to at least a first reference block in a first reference picture;

determining, for a sample in the current block, at least a first reference sample in the first reference block, the first reference sample being co-located to the sample in the current block;

calculating a weighted sum of a plurality of terms and an offset for the LIC according to a plurality of parameter values for a plurality of parameters used in the LIC, the plurality of parameter values comprising at least a first weighting value for a first weighting that is applied to a non-linear term of the first reference sample of a kth power, wherein k comprises a power index value that is equal to 2; and encoding, in the video bitstream, the sample in the current block according to the weighted sum.

* * * * *